United States Patent

[11] 3,629,604

[72] Inventors Anton Halder
Muhlhausen Schwenningen;
Erwin Buhl, Frittlingen, both of Germany
[21] Appl. No. 50,141
[22] Filed June 26, 1970
[45] Patented Dec. 21, 1971
[73] Assignee J. Hengstler K.G. Aldingen Kreis
Tuttlingen, Germany
[32] Priority Aug. 8, 1969
[33] Germany
[31] P 19 40 337.3

[54] PULSE-CONDUCTING CIRCUIT ARRANGED TO DETECT TROUBLES IN ITS OPERATION
12 Claims, 1 Drawing Fig.
[52] U.S. Cl. ................................................ 307/106, 317/137
[51] Int. Cl. ................................................ H03k 3/00
[50] Field of Search ................................................ 328/111; 317/DIG. 5, 123, 148.5; 307/106

[56] References Cited
UNITED STATES PATENTS
3,111,558   11/1963   Proctor .................... 317/DIG. 5
3,312,894   4/1967   Blake et al. .................... 328/111

*Primary Examiner*—L. T. Hix
*Attorney*—Spencer & Kaye

ABSTRACT: A pulse source is operable to deliver pulses having a current value within a predetermined range and a predetermined duration. A detecting circuit is connected to said pulse source and arranged to detect a condition in which one of said pulses has a current value outside said range or a duration which is shorter than said predetermined duration. The detecting circuit comprises means for adjusting said range and a relay, which is connected to a voltage source and arranged to give a predetermined response when said voltage source applies a predetermined voltage to said relay and said detecting circuit detects said condition.

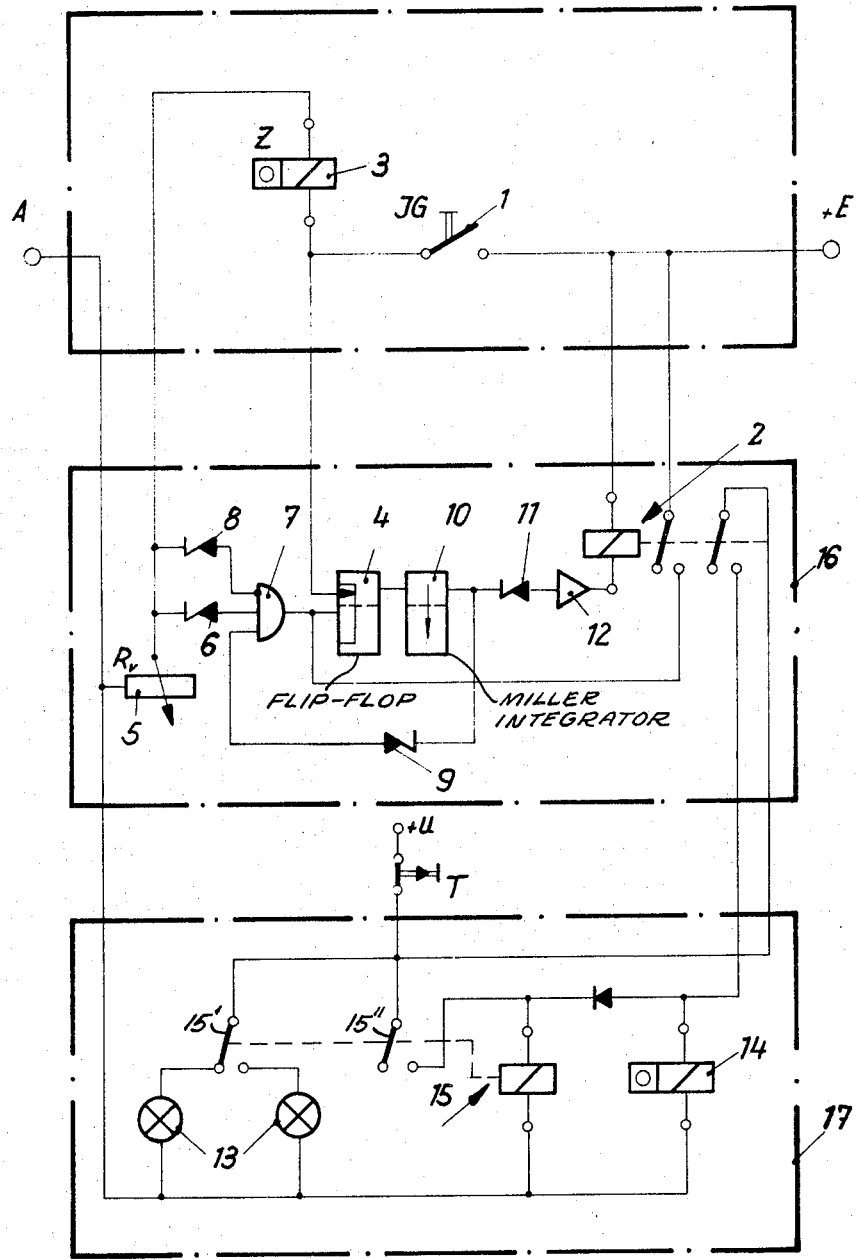

3,629,604

PULSE-CONDUCTING CIRCUIT ARRANGED TO DETECT TROUBLES IN ITS OPERATION

This invention relates to a device for detecting troubles in the operation of pulse-conducting circuits.

Particularly in the operation of electromagnetic pulse counters it is important to detect variations of the voltage, current value and duration of pulses from predetermined values in order to avoid counting errors.

This object is accomplished according to the invention by a relay, which is energized by a predetermined voltage. When the current value of the pulses falls below or exceeds the limits of the predetermined range and/or the pulse duration is shorter than a predetermined duration, this relay is deenergized and a trouble is signalled by means of the contacts which are associated with the relay. For this purpose, each pulse in the device according to the invention sets during trouble-free operation a bistable multivibrator (flip-flop) from an initial position and primes an AND gate, provided that the current value of the pulse (voltage drop across $R_r$) is within a range defined by two Zener diodes. The output voltage of the flip-flop is time integrated by a Miller integrator and the bistable flip-flop is reset by the output of the AND gate when the integrated voltage exceeds the threshold value of another Zener diode during the duration of the pulse to be counted.

If these conditions are not met, i.e., if the current value and/or the duration of the pulse are outside the predetermined ranges, the flip-flop is not reset but the output voltage of the integrator continues to rise and when it exceeds the threshold value of a Zener diode controls by means of an amplifier the relay which indicates the trouble.

A variable resistor enables an adaptation of the device to various voltages. An adjustable Miller integrator permits of a setting of a desired pulse duration.

The troubles which have thus been detected are communicated in accordance with the invention to another device, in which they initiate visual or audible signals and may be counted, if desired. The components of the device are suitably combined in units, which may be plugged into the panel in addition to the counter so that the latter is supervised.

The drawing shows diagrammatically and by way of example an embodiment of a device according to the invention.

A voltage +E is applied to a pulse generator JG1 and to a relay 2. Pulse generator JG1 is illustrated schematically as a switch which, as is obvious, will deliver a current pulse to a counter 3 each time the switch is momentarily closed. The circuit is operative only when +E has a predetermined value. The pulses delivered by the pulse generator 1 are counted by the counter 3. A flip-flop stage 4 is connected in parallel to the counter 3 and is set in response to each pulse produced by pulse generator JG1.

The current pulse applied to the counter 3 results in a voltage drop across a variable resistor ($R_r$) 5 which serves as a current-voltage transducer: that is the variable resistance 5 provides a voltage drop between the movable contact thereof and the terminal A (0 volts) which is proportional to the value of the pulse current flowing through counter 3 since the resistance presented at the terminals of Zener diodes 6 and 8 is very high. When this voltage drop exceeds a lower value determined by a Zener diode 6 and does not exceed an upper limit determined by the Zener diode 8, a voltage is applied by these Zener diodes 6 and 8 to two inputs of an AND-gate 7 to prime the same.

The AND gate produces an output when the output voltage of the integrator 10 exceeds the lower limit defined by the Zener diode 9 while the two other inputs are still primed. In that case, the output signal of the AND gate resets the flip-flop stage 4 to its initial condition.

If the pulse transmitted by the pulse generator JG is too short, no signal will be applied to the priming inputs of the AND-gate 7 when the output signal of the integrator 10 exceeds the threshold of the Zener diode 9. Hence, there is no output signal from the AND gate and the flip-flop stage 4 is not reset and hence continues to supply an output voltage to the Miller integrator 10. In this case, the output voltage of the integrator 10 continues to rise until it exceeds the threshold of a Zener diode 11 and the output of the latter is used by means of an amplifier 12 to deenergize the relay 2 so that the relay contacts produce a trouble signal. This trouble signal is indicated in the present embodiment by the signal lamps 13 controlled by the relay contacts 15' of a relay 15 and is counted by the counter 14. Besides, the trouble signal is maintained by a holding contact 15 of relay 15 until the circuit is interrupted, e.g., by an operation of a key T.

The components of the circuits 16 and 17 may be combined in pluggable units, which in addition to the counter 3, which preferably can be plugged too, can be plugged into a panel to supervise the counter.

What is claimed is:

1. A pulse-conducting circuit arranged to detect troubles in its operation comprising
    a pulse source operable to deliver pulses having a current value within a predetermined range and a predetermined duration,
    a voltage source,
    a detecting circuit means connected to said pulse source for detecting a condition in which one of said pulses has a current value outside said range or a duration which is shorter than said predetermined duration, and providing an output signal indicative thereof, said detecting circuit means including means for adjusting said range, and
    a relay means which is connected to said voltage source and to the output of said detecting circuit means for producing a predetermined response when said voltage source applies a predetermined voltage to said relay and said detecting circuit means provides said output signal.

2. A pulse-conducting circuit as set forth in claim 1, in which said circuit comprised an electromagnetic pulse counter connected to said pulse source.

3. A pulse-conducting circuit as set forth in claim 1, in which said detecting circuit means comprises
    a current-voltage transducer means arranged to receive said pulses and produce a transducer output voltage representative of the current value of said pulses,
    a Zener diode circuit arranged to receive said transducer output voltage and comprising first and second Zener diodes having threshold values respectively corresponding to upper and lower limits of said range, said Zener diode circuit being arranged to produce first Zener output voltages when said transducer output voltage is between said threshold values,
    a Miller integrator for producing a time-integrated output voltage of an input signal thereto,
    a third Zener diode arranged to receive said time-integrated output voltage and to produce a second Zener output voltage when said time-integrated voltage exceeds a threshold value of said third Zener diode,
    an AND gate which has first and second inputs arranged to receive said first Zener output voltages, and a third input arranged to receive said second Zener output voltage, and
    a flip-flop which is arranged to be set in response to each output pulse from said pulse generator and to be reset in response to an output of said AND gate, the set output of said flip-flop being connected to the input of said Miller integrator, said flip-flop when reset being arranged to inhibit said predetermined response of said relay.

4. A pulse-conducting circuit as set forth in claim 3, wherein said detecting circuit means further comprises
    a fourth Zener diode having a higher threshold value than said third diode arranged to receive said integrated output voltage and to produce a third Zener output voltage when said integrated output voltage exceeds the threshold value of said fourth Zener diode, and
    an amplifier arranged to receive said third Zener output voltage and to deliver an amplified trouble-indicating signal to said relay in response to said third Zener output voltage to cause said relay to produce said predetermined response.

5. A pulse-conducting circuit as set forth in claim 3, in which said transducer comprises a resistor arranged to receive said pulses and to produce a transducer output voltage which is representative of the current value of said pulses.

6. A pulse-conducting circuit as set forth in claim 3, in which integrator is adjustable to produce said time-integrated output voltage exceeding the threshold value of said third Zener diode within predetermined time corresponding to said predetermined duration.

7. A pulse-conducting circuit as set forth in claim 1, in which said detecting circuit means includes a variable resistor which is arranged to receive said pulses and to produce a resistor output voltage which is representative of the current value of said pulses.

8. A pulse-conducting circuit as set forth in claim 1, in which
   said relay includes contact means operable by said predetermined response of said relay and
   signalling means which are responsive to the operation of said contacts.

9. A pulse-conducting circuit as set forth in claim 8, which includes means for counting said responses of said relay.

10. A pulse-conducting circuit as set forth in claim 8, which includes
    a holding circuit arranged to be closed by said predetermined response of said relay and to hold itself and
    circuit breaking means for arbitrarily opening said holding circuit.

11. A pulse-conducting circuit as set forth in claim 10, in which said circuit breaking means comprise a key-operable switch.

12. A pulse-conducting circuit as set forth in claim 1, which comprised components combined in at least one pluggable unit.

* * * * *